United States Patent
Burkart et al.

(10) Patent No.: US 8,612,723 B2
(45) Date of Patent: Dec. 17, 2013

(54) SYSTEM AND METHOD FOR STORING A SPARSE MATRIX

(75) Inventors: Scott Michael Burkart, Royse City, TX (US); Matthew Pascal DeLaquil, Rockwall, TX (US); Deepak Prasanna, Rockwall, TX (US); Joshua David Anderson, Dallas, TX (US)

(73) Assignee: L-3 Communications Integrated Systems, L.P., Greenville, TX (US)

( * ) Notice: Subject to any disclaimer, the term of this patent is extended or adjusted under 35 U.S.C. 154(b) by 1280 days.

(21) Appl. No.: 12/115,805

(22) Filed: May 6, 2008

(65) Prior Publication Data
US 2009/0282207 A1 Nov. 12, 2009

(51) Int. Cl.
*G06F 12/00* (2006.01)
(52) U.S. Cl.
USPC ........................................................ 711/217
(58) Field of Classification Search
None
See application file for complete search history.

(56) References Cited

U.S. PATENT DOCUMENTS

| 4,161,719 | A | * | 7/1979 | Parikh et al. ............... 375/365 |
| 2005/0232512 | A1 | * | 10/2005 | Luk et al. .................... 382/276 |
| 2006/0020595 | A1 | | 1/2006 | Norton et al. | |
| 2007/0192286 | A1 | | 8/2007 | Norton et al. | |

OTHER PUBLICATIONS

J. Dongarra; Sparse Matrix Storage Formats; http://www.cs.utk.edu/~dongarra/etemplates/node372.html.
Sparse Matrices and Their Data Structures (PSC§4.2); www.math.uu.nl/people/bisselin/PSC/psc4_2.pdf.

* cited by examiner

*Primary Examiner* — Brian Peugh
(74) *Attorney, Agent, or Firm* — Hovey Williams LLP

(57) ABSTRACT

A system and method for storing and retrieving a sparse matrix from memory of a computing device while minimizing the amount of data stored and costly jumps in memory. The computing device may be an FPGA having memory and processing elements. The method comprises storing non-zero data elements of the matrix in a data array and storing their corresponding column address values in a column index array. To read this stored data from memory, each preceding value of the column index array may be compared with each current value of the column index array to determine if the data array value corresponding with the current column index array value belongs on the next row of the matrix. The method may include pre-ordering the matrix with zero-pad placeholders or creating a row increment pointer array which typically stores fewer values than the number of rows in the matrix.

9 Claims, 6 Drawing Sheets

SYSTEM AND METHOD FOR STORING A SPARSE MATRIX

BACKGROUND

1. Field

Embodiments of the present invention relate to a system and method for storing sparse matrices, and more particularly, to variations of the compressed row storage (CRS) format for storing and retrieval of sparse matrices in a computing device.

2. Related Art

Many applications in science and engineering require the solution to large matrix equations, such as computational fluid dynamics, electromagnetics, geophysical exploration, economics, linear programming, astronomy, chemistry, and structural analysis. Solving a large matrix equation is computationally expensive. Many computer resources are required and the elapse of time-to-solution can be prohibitively long. Decreasing solution times may allow the same analysis to be conducted in less time or higher-resolution analysis to be conducted in the same amount of time.

For large eigenvalue problems, if the coefficient matrix A is sparse (contains mostly zeros), the problems can be most efficiently solved if the zero elements of matrix A are neither manipulated nor stored. Sparse storage schemes allocate contiguous storage in memory for the nonzero elements of the matrix, using a scheme for knowing where the non-zero elements fit into the full matrix. There are many existing schemes for sparse matrix storage. Some are based on assumptions about the distribution of non-zeros within the matrix.

One method typically used for storing large sparse matrices in the aforementioned applications is the compressed row storage (CRS) format. The CRS format does not make assumptions about the distribution of non-zeros within the matrix, but also does not store any unnecessary matrix elements. The CRS format takes the nonzero elements of the matrix in row-major order and places them in contiguous memory locations. Three vectors or one-dimensional arrays are created from the matrix: one for storing the nonzero elements (data array "a") of the matrix, one for storing the column addresses (col_idx array) of the nonzero elements, and one for the locations in the data array "a" that contain the first non-zero element of a row (row_ptr array). The last value in the row_ptr array, or row_ptr(n+1), is assigned the number of nonzeros (nnz) in the matrix plus one, where "n" is the rank of the matrix. So, instead of requiring $n^2$ storage locations, the CRS format only stores 2nnz+n+1 storage locations.

Below is an example matrix and its resulting arrays:

$$A = \begin{bmatrix} a_1 & a_2 & 0 & 0 & 0 & a_3 \\ 0 & a_4 & 0 & 0 & 0 & 0 \\ 0 & 0 & 0 & a_5 & a_6 & 0 \\ 0 & 0 & 0 & 0 & a_7 & a_8 \\ 0 & a_9 & 0 & a_{10} & 0 & 0 \\ 0 & 0 & 0 & 0 & a_{11} & 0 \end{bmatrix}$$

a=[$a_1$ $a_2$ $a_3$ $a_4$ $a_5$ $a_6$ $a_7$ $a_8$ $a_9$ $a_{10}$ $a_{11}$]
col_idx=[1 2 6 2 4 5 5 6 2 4 5]
row_ptr=[1 4 5 7 9 11 12]

So col_idx stores the matrix column addresses of the elements of data array "a", and the row_ptr array stores the locations in data array "a" of the first non-zero elements in a row, with row_idx(n+1)=nnz+1.

The CRS format, as described above, is somewhat inefficient, since it requires the use of non-sequential memory, specifically the row_ptr array, to access the matrix data.

SUMMARY

Various embodiments of the present invention provide a method of storing a sparse matrix to a memory element, such as a memory element of a field programmable gate array (FPGA). Specifically, the present invention provides a method that improves on the prior art method of compressed row storage (CRS) by either limiting or eliminating the need for a row pointer array. Minimizing the use of a pointer array allows for the matrix data to be read sequentially from memory without costly non-sequential jumps in memory. The sparse matrix stored in the memory element may have a plurality of zeros, a plurality of non-zero elements, a plurality of columns and a plurality of rows.

Various embodiments of the invention comprise the steps of storing the non-zero elements of the sparse matrix in a data array "a" and their corresponding column addresses in a column index (col_idx) array sequentially in row-major order. Then the row address of the elements may generally be assumed by comparing the current column address with a previous column address to determine if the data should be applied to the next row. For example, if the values stored in the data array and the col_idx array are read in row major order, and a column address value of 2 is stored immediately after a column address value of 6 in the column index array, it may be assumed that the non-zero element associated with the column address 2 is the first non-zero element of the next row. Using an FPGA, these comparison calculations may run in parallel with the sequential reading of the arrays from memory.

However, sometimes in sparse matrices the last non-zero element of an immediately preceding row has a column address less than the column address of the first non-zero element of a current row, in which case the comparison of the two column addresses would not indicate that a new row has begun. The present invention provides two embodiments of matrix storage to compensate for such occurrences.

In one embodiment, zero-pad placeholders may be inserted into the matrix, creating an augmented matrix. In the augmented matrix, if the last non-zero element of preceding row has a column address that is less than the column address of the first non-zero element of the current row, then a zero-pad placeholder may be assigned to the last column of the preceding row. The zero-pad placeholders may be treated like non-zero elements for purposes of storing elements sequentially in the data array and storing these element's corresponding column addresses in the col_idx array, but the value assigned to the zero-pad placeholder in memory, for purposes of retrieving the original matrix from the stored arrays, may be zero.

In another embodiment, an augmented matrix is not used. Instead, a pointer array (row_incr_ptr) may be created and may be populated with array index values (i) corresponding to locations in the col_idx array at which col_idx[i] is the first element in a row and col_idx[i-1]<col_idx[i]. So essentially the pointer array in this embodiment of the invention may only be needed in cases where the last non-zero element of an immediately preceding row has a column address less than the column address of the first non-zero element of a current row. The data array "a" and the col_idx array are populated sequentially in row-major order in the same manner as used by the CRS format, described in the Background section above. However, by using the method disclosed herein of comparing a current column address with a previous column address to determine if the current data element belongs on the next row, the pointer array (row_incr_ptr) used in this embodiment of the invention generally stores fewer values and is relied on less than in the CRS format, therefore decreasing the amount of non-sequential jumps in memory to the pointer array (row_incr_ptr).

These and other important aspects of the present invention are described more fully in the detailed description below.

BRIEF DESCRIPTION OF THE DRAWINGS

Embodiments of the present invention are described in detail below with reference to the attached drawing figures, wherein.

Figure 1:
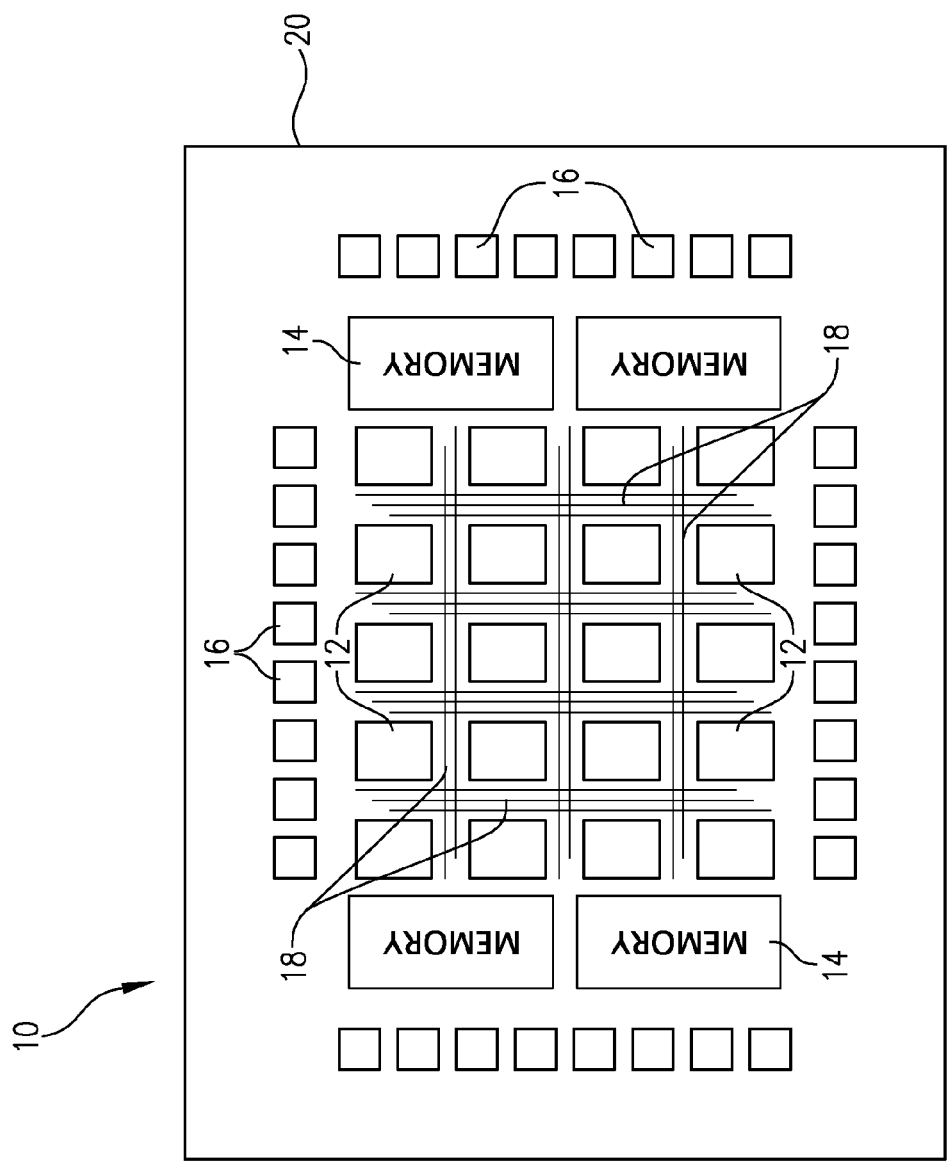
FIG. 1 is a schematic diagram of a computing device according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawing figures that illustrate specific embodiments in which the present invention can be practiced. The embodiments are intended to describe aspects of the invention in sufficient detail to enable those skilled in the art to practice the invention.

Other embodiments can be utilized and changes can be made without departing from the scope of the present invention. The following detailed description is, therefore, not to be taken in a limiting sense.

Embodiments of the present invention provide variations on the compressed row storage (CRS) format, which is typically used for storing large sparse matrices. The CRS variations disclosed herein may be performed by a computing device 10, such as an FPGA, having a plurality of processing elements 12, a plurality of memory elements 14, a plurality of input/output (I/O) blocks 16, and programmable interconnects 18 positioned on a chip, circuit board, or any suitable support structure. Using the methods described herein, the computing device 10 may allow for the reproduction of the row addresses of a sparse matrix using primarily sequential memory access, with fewer or no costly non-sequential jumps in memory access due to pointer arrays, such as the row_ptr array used in the traditional CRS format. Various embodiments of the present invention therefore use memory data bandwidth more efficiently than prior art methods since sequential memory access runs much faster than random memory access.

In various embodiments, each processing element 12 may be configured for a specific application or operation. The applications include, but are not limited to, solving systems of linear equations for use with computational fluid dynamics, computational electromagnetics, image processing, and datafusion; calculating discrete or fast Fourier transforms (FFTs) and inverse FFTs, filtering signals utilizing finite-impulse response (FIR) or infinite-impulse response (IIR) filtering, and other matrix or vector-based calculations. In some embodiments, the computing device 10 may include more than one processing element 12 with the same configuration to operate on the same application to improve computational throughput. In other embodiments, the computing device 10 may include processing elements 12 with different configurations to operate on different applications. Alternatively, one or more processing elements 12 may have a generalized configuration that allows the processing elements 12 to operate on more than one application.

The processing elements 12 may perform mathematical operations such as addition, subtraction, multiplication, or division using floating-point or fixed-point numerical representation, as well as logical operations such as AND, OR, XOR, and NOT in addition to shifting data in binary form. The processing elements 12 may include adders, subtracters, multipliers, dividers, multiply-accumulators (MAC), logic gates, shift registers, storage registers such as flip flops and latches, combinations thereof, and the like.

In various embodiments, the processing elements 12 may be formed from digital logic circuitry, analog circuitry, or a combination of both. The processing elements 12 may be described as one or more code segments of a hardware description language (HDL) and may be implemented in a field-programmable gate array (FPGA) or other programmable logic device (PLD). The code segments may contain data for performing the methods described herein. The processing elements 12 may also include a microprocessor, a microcontroller, or programmable interface controller/computer (PIC), or combinations thereof. Furthermore, the processing elements 12 may include either fully-custom or semi-custom application-specific integrated circuitry (ASIC).

In various embodiments, each memory element 14 may be configured to store the data related to a specific application. In a similar fashion to the processing elements 12, each memory element 14 may store data for a different application, or more than one memory element 14 may store data for the same application, or one memory element 14 may store data for a plurality of applications.

In various embodiments, each memory element 14 may represent a physically separate memory device. In other embodiments, one or more memory elements 14 may logically exist within the same physical storage device. Alternatively, one memory element 14 may include a plurality of physical storage devices.

The memory elements 14 may be described as one or more code segments of an HDL and may be implemented in an FPGA or other PLD. The code segments may contain data for performing the methods described herein. The memory elements 14 may have one or more multi-bit address busses, one or more read data ports, and one or more write data ports. The memory elements 14 may also include storage registers such as flip flops or latches, random-access memory (RAM) such as static RAM (SRAM) or dynamic RAM (DRAM), programmable read-only memory (PROM) such as an erasable PROM (EPROM), cache memory, flash memory, hard-disk drives, floppy disks, optical disks, and the like, or combinations thereof.

The I/O blocks 16 may provide an interface between package pins and the processing elements 12, memory elements 14, and programmable interconnects 18 of the computing device 10. In various embodiments of the invention, the I/O blocks 16 may comprise programmable logic components, and may perform mathematical operations such as addition, subtraction, multiplication, or division using floating-point or fixed-point numerical representation, as well as logical operations such as AND, OR, XOR, and NOT in addition to shifting data in binary form. The I/O blocks 16 may include adders, subtracters, multipliers, dividers, multiply-accumulators (MAC), logic gates, shift registers, storage registers such as flip flops and latches, combinations thereof, and the like.

The programmable interconnects 18 may provide communication and the exchange of signals between the processing elements 12, the memory elements 14, and/or external devices coupled to the computing device 10. These programmable interconnects 18 may be reconfigured as needed and may comprise various switches, such as a crossbar switch. For example, the programmable interconnects 18 may be a reconfigurable interconnect network comprising switching elements, control elements, processor interface units, memory interface units, and application control units, such as those described in U.S. patent application Ser. No. 11/969, 003, which is hereby incorporated by reference in its entirety to an extent not inconsistent with the invention disclosed herein.

The computing device 10 may contain code segments for performing the following methods for storing and accessing a sparse matrix. In one embodiment of the present invention, the method of storing a sparse matrix in the memory elements 14 comprises the steps of creating an augmented matrix A' which may contain zero-pad placeholders, sequentially populating a first array with the non-zero elements, and sequentially populating a second array with the column addresses for each non-zero element. Note that this method does not include creating a row pointer array such as row_ptr described in the Background above. Instead, by pre-ordering the data in the following fashion, the row pointer array used in traditional CRS formats can be eliminated, with the advantage that the data may be read from memory sequentially with no costly jumps to the row pointer array as in traditional CRS format.

Figure 2:
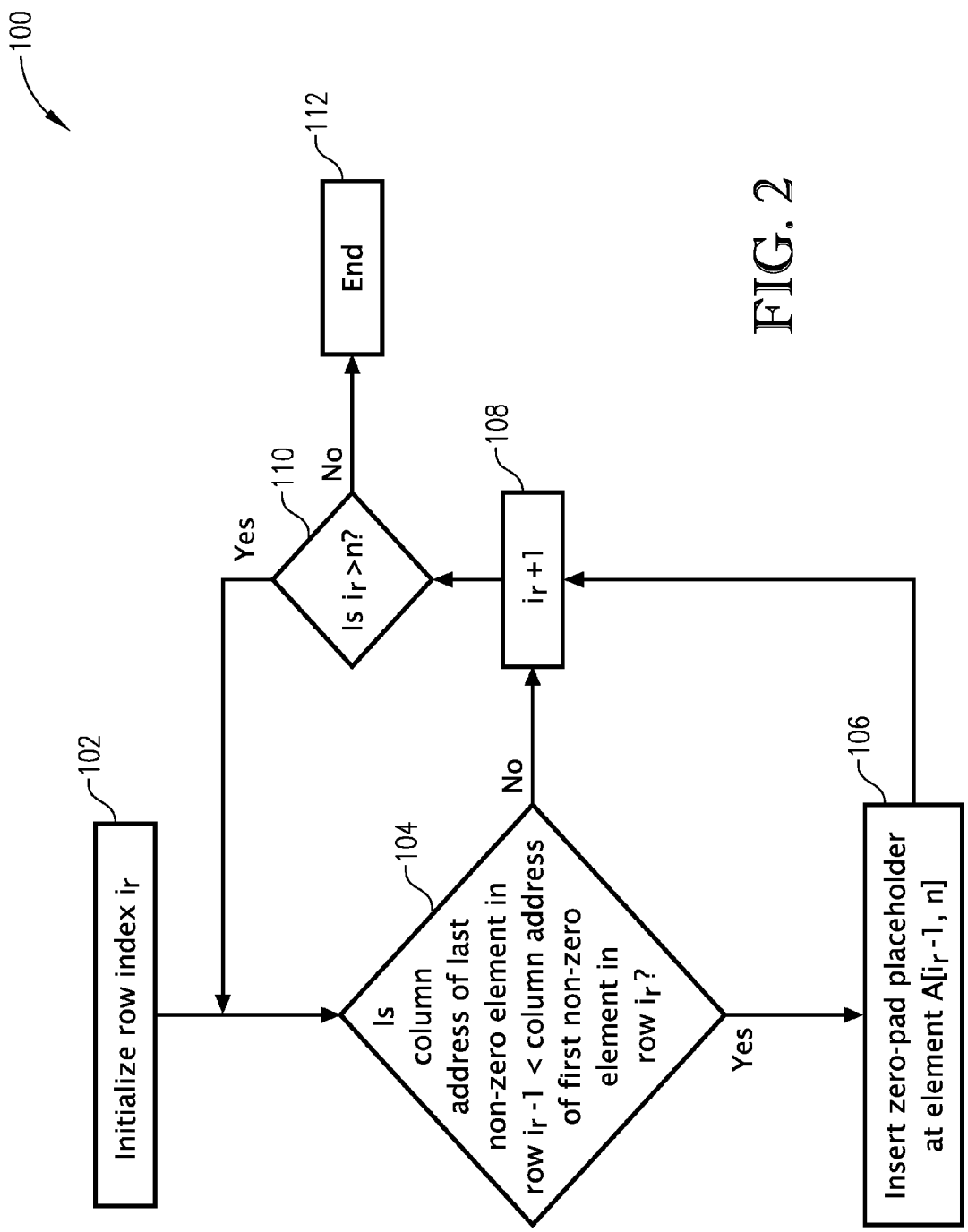
FIG. 2 is a flow chart illustrating steps for the computing device of FIG. 1 to augment a matrix with zero-pad placeholders.

FIG. 2 illustrates certain steps in an exemplary method 100 of pre-ordering or augmenting the matrix. The particular order of the steps illustrated in FIG. 2 and described herein can be altered without departing from the scope of the invention. For example, some of the illustrated steps may be reversed, combined, or even removed entirely.

In step 102, a row index "$i_r$" is initialized. In this example, row index "$i_r$" represents a row address of the matrix. The row index "$i_r$" may be initialized as 1 or as any integer value.

In step 104, a user or computing device 10 determines if the column address of the last non-zero element in row $i_r-1$ is less than the column address of the first non-zero element in row $i_r$. If it is, as in step 106, a zero-pad placeholder may be inserted at element position A[$i_r-1$,n], followed by step 108. If it is not, the user or computing device 10 may immediately proceed to step 108.

In step 108, the row index is increased by 1. In step 110, if the row index "$i_r$" is greater than the matrix rank "n", then step 112 ends this process. Otherwise, step 104 is repeated, and the loop continues until the row index is greater than the matrix rank.

The zero-pad placeholder may be a variety of elements, variables, or values which are not equal to zero, but may be assigned the value zero when stored in memory, as described below. This will result in the new matrix, A' with zero-pad placeholders designated as $z_k$, as shown below.

$$A' = \begin{bmatrix} a_1 & a_2 & 0 & 0 & 0 & a_3 \\ 0 & a_4 & 0 & 0 & 0 & z_1 \\ 0 & 0 & 0 & a_5 & a_6 & 0 \\ 0 & 0 & 0 & 0 & a_7 & a_8 \\ 0 & a_9 & 0 & a_{10} & 0 & z_2 \\ 0 & 0 & 0 & 0 & a_{11} & 0 \end{bmatrix}$$

Then the pre-ordered matrix A' may be represented using the data array "a" and the col_idx array as shown below, with the non-zero elements and their corresponding column addresses stored sequentially in row-major order. Note that, in this embodiment, the zero-pad placeholders are stored as zeroes in the data array "a".

a=[$a_1$ $a_2$ $a_3$ $a_4$ 0 $a_5$ $a_6$ $a_7$ $a_8$ $a_9$ $a_{10}$ 0 $a_{11}$]
col_idx=[1 2 6 2 6 4 5 5 6 2 4 6 5]

Figure 3:
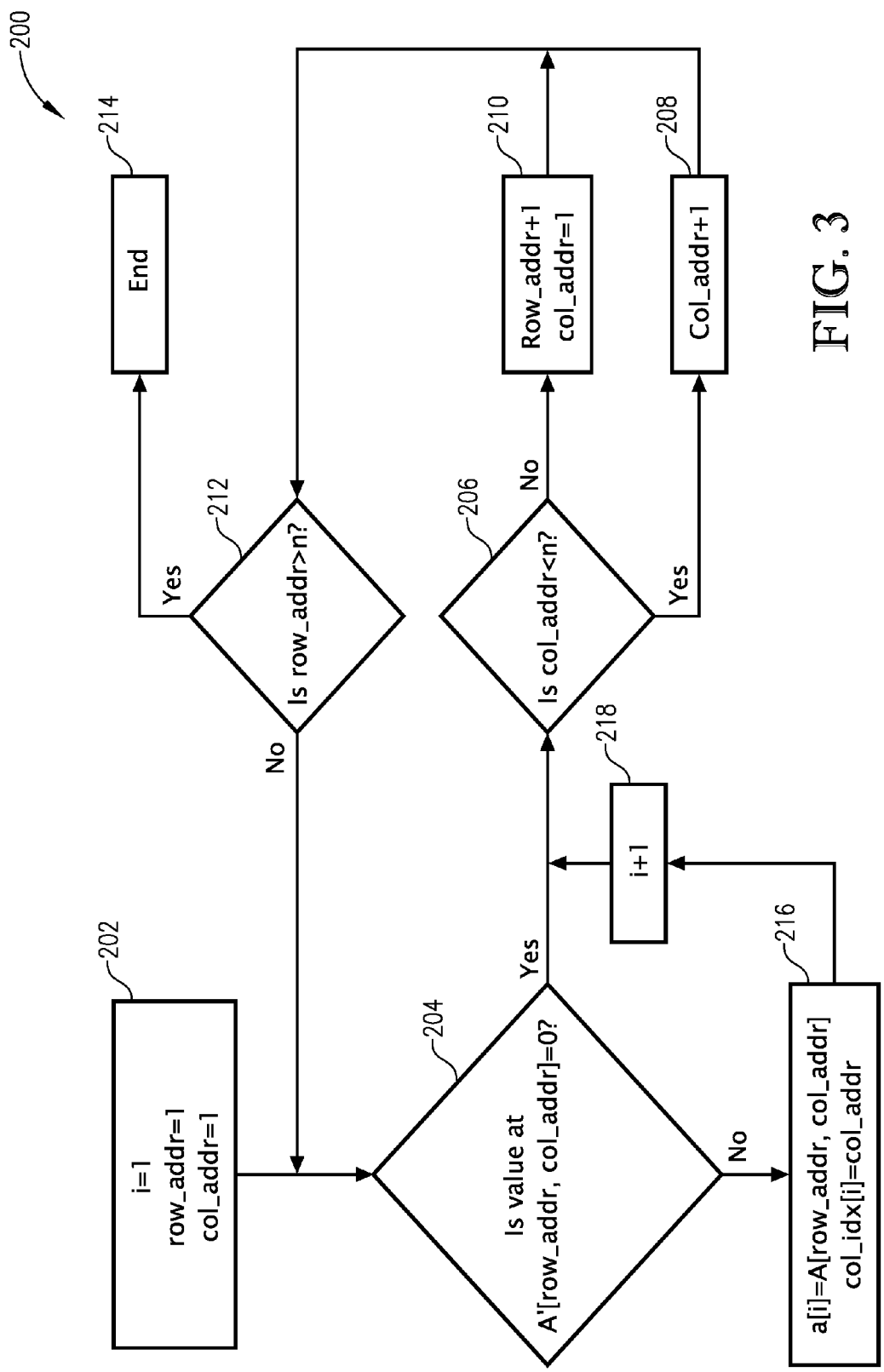
FIG. 3 is a flow chart illustrating steps for the computing device of FIG. 1 to store a sparse matrix in memory according to embodiments of the present invention.

FIG. 3 illustrates certain steps in an exemplary method 200 for storing the matrix in memory using the augmented matrix A'. The particular order of the steps illustrated in FIG. 3 and described herein can be altered without departing from the scope of the invention. For example, some of the illustrated steps may be reversed, combined, or even removed entirely.

In step 202, an array index value (i) is initialized with an integer value, such as 1. The array index value "i" represents locations in both the data array "a" and the col_idx array. In step 202, the row address (row_addr) value and column address (col_addr) value of the matrix or augmented matrix are each initialized with an integer value, such as 1.

In step 204, the computing device 10 may determine if the element stored at the row_addr value and the col_addr value of the augmented matrix A' equals zero. If A'[row_addr, col_addr]=0, then step 206 determines if the column address is less than the matrix rank "n". If col_addr is less than n, then col_addr may be increased by 1, as in step 208. If col_addr is not less than n, then col_addr may be reset to 1, and the row_addr may be increased by 1, as in step 210.

Following step 208 or 210, step 212 may determine if the row address is greater than the matrix rank "n". If row_addr is greater than n, then step 214 ends the process. If row_addr is not greater than n, then step 204 is repeated.

Following step 204, if the value stored at A'[row_addr, col_addr] is not equal to zero, then step 216 is performed. Step 216 assigns the value located at the row_addr and col_addr of the original matrix A to the array index "i" location of data array "a". In other words, a[i]=A[row_addr,col_addr]. Additionally, step 216 also assigns the column address value to the array index "i" location of the col_idx array.

By assigning the original matrix value for the row and column address to the data array in step 216, even if the augmented matrix value at the same address is a zero placeholder, the appropriate value, namely zero, may still be stored in the data array "a" without the need to perform additional calculations. In other words, the augmented matrix A' is used to determine which elements of the original matrix A should be stored in memory 14.

In step 218, the array index "i" may be increased by 1 and step 206 may then be performed, followed by step 208 or 210.

As mentioned above, step 204 continues to be repeated until the row address is greater than the matrix rank "n".

To access this data or to reproduce the original matrix A once it is stored in memory 14 as described above, the row addresses may be reproduced as the data is read out sequentially. In general, after the row address is initialized, it is incremented each time that col_idx[i]≤col_idx[i−1].

Figure 4:
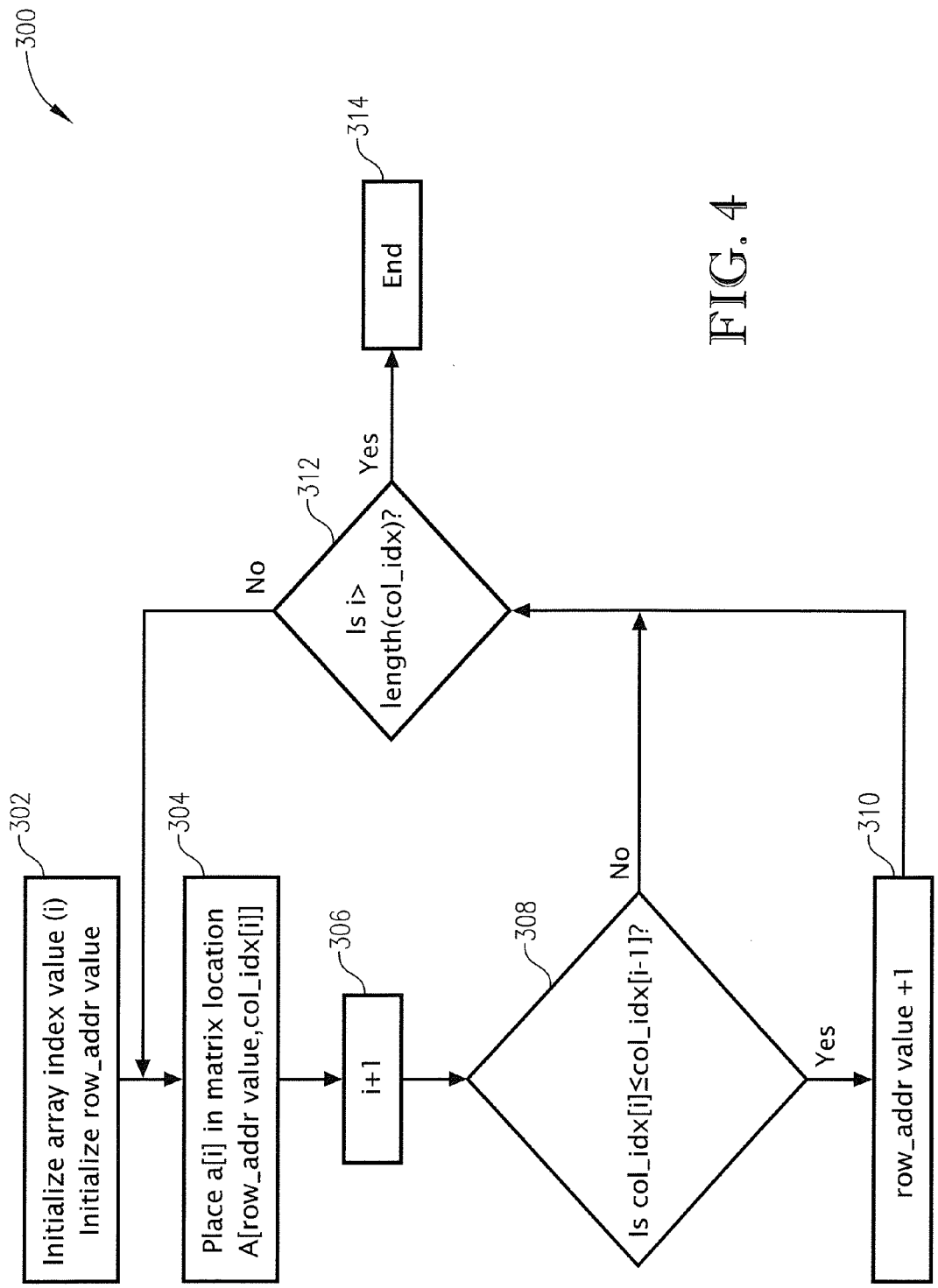
FIG. 4 is a flow chart illustrating steps for the computing device of FIG. 1 to output a matrix stored in memory according to embodiments of the present invention.

FIG. 4 illustrates certain steps in an exemplary method 300 of reproducing the original matrix A from the data array "a" and the col_idx array. The particular order of the steps illustrated in FIG. 4 and described herein can be altered without departing from the scope of the invention. For example, some of the illustrated steps may be reversed, combined, or even removed entirely.

A data matrix of a desired size may be initialized with all zeros (not shown). In step 302, a row address value and an array index value (i) may also be initialized. The array index may indicate a location within the data array "a" and the col_idx array. So, for example, the array index and the row address are both preferably initialized at 1, though they may be initialized with any integer number as required by a given application.

In step 304, the data at the array index location in the data array "a" may be assigned or output to its corresponding column address, as stored at the array index location in the col_idx array, and to the row address of the matrix corresponding to the row address value (row_addr). Then, in step 306, the array index may be updated, such as by increasing the array index by 1.

In step 308, the column address stored at the updated array index location "i" in the col_idx array may be compared with the previous column address stored at the previous array index location i−1 in the col_idx array. If the column address stored at the updated array index location is less than or equal to the column address at the previous array index location, then the row address value may be increased by 1, as in step 310. Otherwise, the row address may remain the same.

In step 312, the array index "i" may be compared with the length of the col_idx array or the data array "a". In step 314, if "i" is greater than the length of the col_idx array, then the process ends. Otherwise, step 304 is repeated. The method above may repeat, as illustrated in FIG. 4.

In various embodiments of the invention, instead of using the row pointer array (row_ptr) used in traditional CRS format, the method uses a row increment pointer array (row_incr_ptr). In this embodiment of the invention, zero-pad placeholders are not used. Instead, data array "a" and col_idx array are populated sequentially in row major order as in traditional CRS format. The row increment pointer array contains only index values of col_idx at which col_idx[i] is the first non-zero element in a row and col_idx[i−1]<col_idx[i]. So, for matrix A (see Background), the following arrays are stored in memory 14.

a=[$a_1$ $a_2$ $a_3$ $a_4$ $a_5$ $a_6$ $a_7$ $a_8$ $a_9$ $a_{10}$ $a_{11}$]
col_idx=[1 2 6 2 4 5 5 6 2 4 5]
row_incr_ptr=[5 11]

Figure 5:
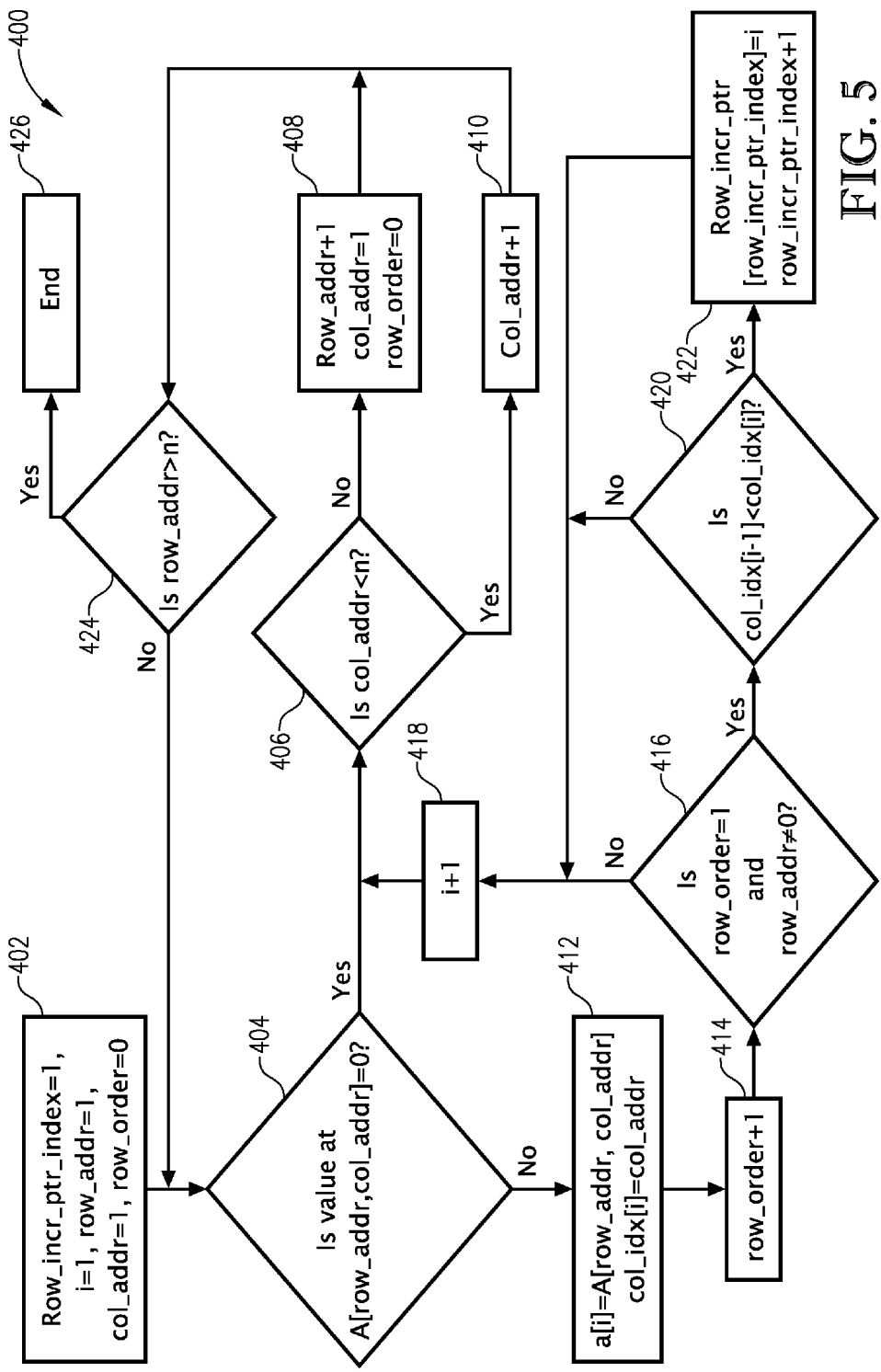
FIG. 5 is a flow chart illustrating steps for the computing device of FIG. 1 to store a sparse matrix in memory according to embodiments of the present invention.

FIG. 5 illustrates certain steps in an exemplary method 400 of storing the matrix into three arrays. The particular order of the steps illustrated in FIG. 5 and described herein can be altered without departing from the scope of the invention. For example, some of the illustrated steps may be reversed, combined, or even removed entirely.

In step 402, a row increment pointer index (row_incr_ptr_index), the array index (i), the row address (row_addr), and the column address (col_addr) of the matrix may each be initialized with the value 1, and another variable for denoting the order of the non-zero elements within each row (row_order) may be initialized with the value zero. In step 404, a user or the computing device 10 may determine if the element in the matrix at the row_addr and col_addr equals zero.

If the matrix element does equal zero, step 406 may check to see if the column address is still less than the matrix rank "n", or in other words that the end of the row has not yet been reached. If the end of the row has been reached such that the column address is not less than the matrix rank "n", then in step 408, the column address may be reset to 1, the row address may be increased by 1, and the row_order may be reset to zero. If the end of the row has not been reached such that the column address is less than the matrix rank "n", then in step 410, the column address may be increased by 1. After either of steps 408 and 410, step 424 compares the row address with the matrix rank "n". If the row address is not greater than the matrix rank "n", then step 404 and its subsequent steps may be repeated for the updated matrix coordinate. If the row address is greater than the matrix rank "n", as in step 426, the process ends.

If the element at the current row address and column address does not equal zero in step 404, then that element may be assigned to the array index (i) position of data array "a" and the column address may be assigned to the array index (i) position of the col_idx array, as in step 412. Then row_order may be increased by 1, as in step 414. Step 416 may determine if the row_order equals 1 and the row address does not equal zero. If one or both of these conditions are not met, then in step 418 the array index (i) may be increased by 1, followed by step 406 and its subsequent steps.

If both conditions of step 416 are met, then step 420 may determine if the previous col_idx value at array index i−1 is less than the current col_idx value at array index i. If it is not, then step 418 may be performed, followed by step 406 and its subsequent steps. If the conditions of step 420 are met, then step 422 may assign the current array index value i to the row_incr_ptr array at the location corresponding with the value of the row_incr_ptr_index and increase the row_incr_ptr_index by 1. Step 422 may be followed by the step 418 of adding 1 to the array index (i), which is followed by step 406 and its subsequent steps.

If the matrix is stored using the row_incr_ptr as described above and illustrated in FIG. 5, then as data is read out sequentially, the row address can be reproduced in parallel with few jumps in memory to row_inr_ptr. In one embodiment of the invention, as in previous embodiments of the invention, the data matrix of a desired size may be initialized with all zeros.

Figure 6:
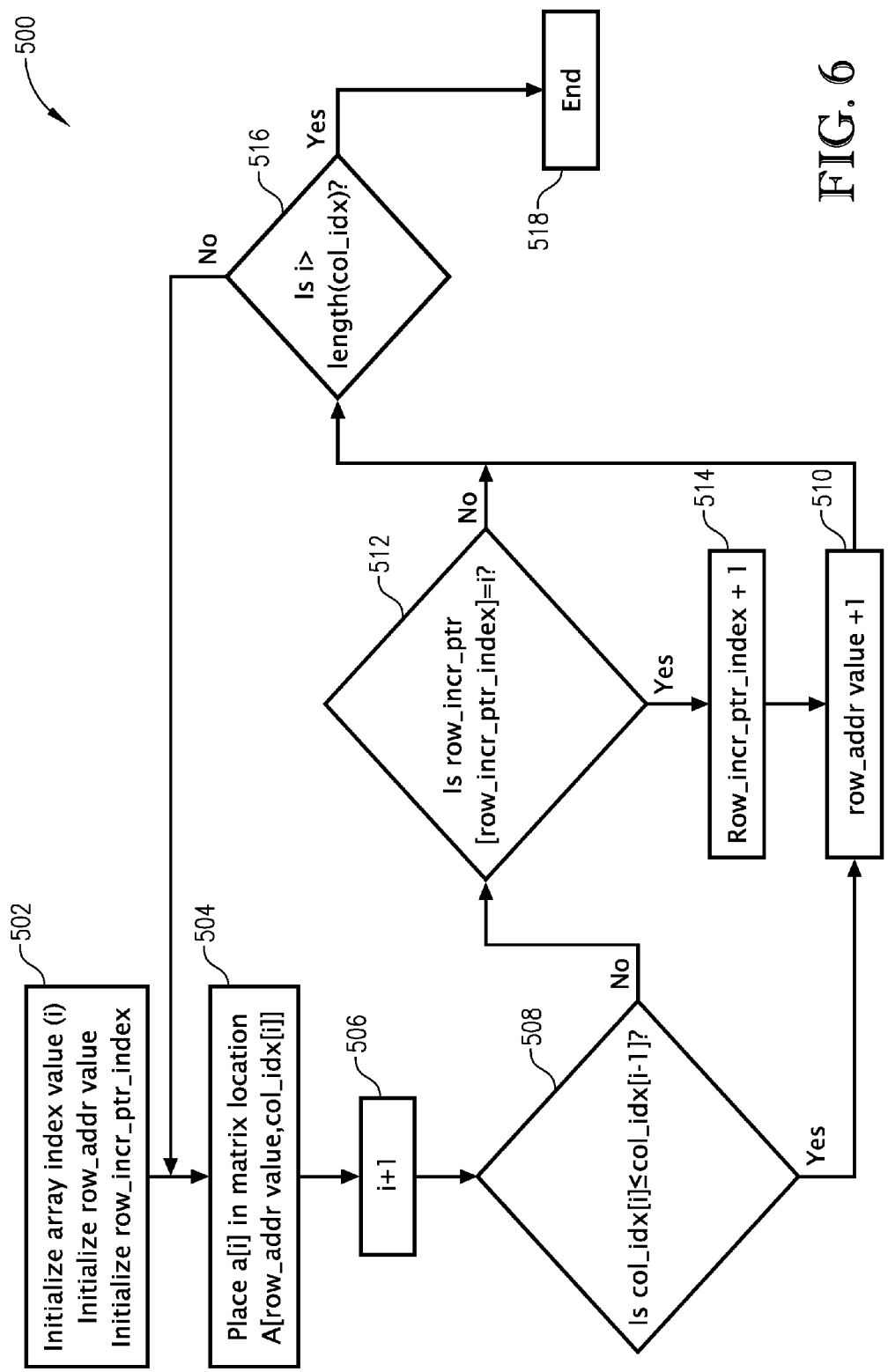
FIG. 6 is a flow chart illustrating steps for the computing device of FIG. 1 to output a matrix stored in memory according to embodiments of the present invention.

FIG. 6 illustrates certain steps in an exemplary method 500 of reproducing or accessing the matrix from the data array. The particular order of the steps illustrated in FIG. 6 and described herein can be altered without departing from the scope of the invention. For example, some of the illustrated steps may be reversed, combined, or even removed entirely.

In step 502, the row address value and the array index value may be initialized as an integer number such as 1, and the row increment pointer index value (row_incr_ptr_index) may be initialized as an integer number, such as 1, representing a location in the row increment pointer array (row_incr_ptr).

In step 504, the data array "a" element corresponding with the current array index value may be assigned to the appropriate row and column address location in the matrix. Specifically, the appropriate row and column address location is at a row of the matrix corresponding with the current row address value and a column of the matrix corresponding with the column address value stored at the current array index value of the col_idx array. In other words, A[row_addr, col_idx[i]]=a[i].

Next, in step 506, the array index value may be updated, such as by increasing its value by 1. Then the current row address value may also be updated, such as by increasing its value by 1, if the column address value stored at the current array index value location in the col_addr array is less than or equal to the column address value stored at the previous array index value's location in the col_idx array. In other words, as in step 508, if col_idx[i]≤col_idx[i−1], then the row address value may be updated, such as by increasing the row address value by 1, as in step 510.

If col_idx[i] is greater than col_idx[i−1], then step 512 compares the value stored at the row increment pointer index value in the row_incr_ptr array to the array index value "i". So, if row_incr_ptr[row_incr_ptr_index]=i, then in step 514, the row_incr_ptr_index may be increased by 1. This may be followed by step 510, wherein the row address value may be increased by 1.

Step 514 is performed if, in step 512, row_incr_ptr[row_incr_ptr_index]≠i, or it is performed after the row_addr value has been increased by 1 as in step 510. Step 516 compares the array index "i" with the length of the col_idx array. If i>length(col_idx), then the process is ended at step 518. Otherwise, step 504 and its subsequent steps are repeated for the next data array value.

For example, the pseudo-code below illustrates how the matrix data may be read from memory 14.

```
row_addr = 1;
row_incr_ptr_index=1;
for index i=1 to length (col_idx)+1 do
    col_addr = col_idx(i)
    if i>1 then
        if col_idx(i−1) ≥col_idx(i) then
            increment row_addr
        else
            if row_incr_ptr_index ≤length(row_incr_ptr) then
                if row_incr_ptr[row_incr_ptr_index] == i then
                    increment row_addr
                    increment row_incr_ptr_index
                end if
            end if
        end if
    end if
end for
```

The methods disclosed above may take advantage of the parallel nature of FPGAs for reconstruction of row address information. Specifically, different processing operations do not have to compete for the same resources, allowing various processes described above to be performed in parallel.

Although the invention has been described with reference to the preferred embodiment illustrated in the attached drawing figures, it is noted that equivalents may be employed and substitutions made herein without departing from the scope of the invention as recited in the claims. For example, while the methods herein are described as being performed on an FPGA, the method may be implemented in other computing devices, performed manually by a user, or performed by various computer programs.

Having thus described the preferred embodiment of the invention, what is claimed as new and desired to be protected by Letters Patent includes the following:

1. A method of storing a matrix to at least one memory element, wherein the matrix has a plurality of zeros, a plurality of non-zero elements, a plurality of columns, each column having a column address value, and a plurality of rows, each row having a row address value, the method comprising:
    creating an augmented matrix, wherein, for all of the rows, if the column address value of the last non-zero element in a preceding row is less than the column address value of the first non-zero element in a current row, then a zero-pad placeholder is assigned to the last column of the preceding row;
    creating only a first array and a second array;
    sequentially populating, in row-major order, the first array with each non-zero element of the augmented matrix, including any zero-pad placeholders; and
    sequentially populating, in row-major order, the second array with the matrix column address values for each of the non-zero elements of the augmented matrix, including the column address values for any zero-pad placeholders.

2. The method of claim 1, wherein a value zero is inserted into the first array in place of each zero-pad placeholder.

3. A method of storing a matrix to at least one memory element, wherein the matrix has a plurality of zeros, a plurality of non-zero elements, a plurality of columns, each column having a column address value, and a plurality of rows, each row having a row address value, the method comprising:
    sequentially populating, in row-major order, a first array with each non-zero element of the matrix and a second array with the corresponding column address of each non-zero element of the matrix, both the first array and the second array including a single row with a plurality of column locations;
    creating a counter to count the column locations of the second array;
    incrementing the counter from a previous column location to a current column location; and
    recording the count of the counter in a third array only if the value in the current column location of the second array indicates the first non-zero element of a matrix row and the value in the current column location of the second array is greater than the value in the previous column location of the second array.

4. A computing device for storing elements of a sparse matrix, the sparse matrix comprising zeros and non-zero elements as well as rows having row addresses and columns having column addresses, the computing device comprising:
    processing elements for performing comparison and routing operations; and
    memory elements comprising a code segment for:
        creating an augmented matrix, wherein, for all of the rows, if the column address value of the last non-zero element in a preceding row is less than the column address value of the first non-zero element in a current row, then a zero-pad placeholder is assigned to the last column of the preceding row;
        creating only a first array and a second array;
        sequentially populating, in row-major order, the first array with each non-zero element of the matrix, including any zero-pad placeholders, wherein a value zero is inserted into the first array in place of each zero-pad placeholder; and
        sequentially populating, in row-major order, the second array with the matrix column address values for each of the non-zero elements, including the column address values for any zero-pad placeholders.

5. The computing device of claim 4, further comprising programmable interconnects for communicably connecting the processing elements and the memory elements.

6. The computing device of claim 4, wherein the computing device is a field programmable gate array (FPGA).

7. A computing device for storing elements of a sparse matrix, the sparse matrix comprising zeros and non-zero elements as well as rows having row addresses and columns having column addresses, the computing device comprising:
- processing elements for performing comparison and routing operations; and
- memory elements comprising a code segment for:
    - sequentially populating, in row-major order, a first array with each non-zero element of the matrix and a second array with the corresponding column address of each non-zero element of the matrix, both the first array and the second array including a single row with a plurality of column locations;
    - creating a counter to count the column locations of the second array;
    - incrementing the counter from a previous column location to a current column location; and
    - recording the count of the counter in a third array only if the value in the current column location of the second array indicates the first non-zero element of a matrix row and the value in the current column location of the second array is greater than the value in the previous column location of the second array.

8. The computing device of claim 7, further comprising programmable interconnects for communicably connecting the processing elements and the memory elements.

9. The computing device of claim 7, wherein the computing device may be a field programmable gate array (FPGA).

* * * * *